United States Patent Office 3,101,340
Patented Aug. 20, 1963

3,101,340
4-TERTIARY-BUTYL-, 4-DIPHENYLMETHYL-, AND 4-DIPHENYLHYDROXYMETHYL - PIPERIDINO-PROPIONITRILES
Kurt J. Rorig, Glenview, Ill., assignor to G. D. Searle & Co., Chicago, Ill., a corporation of Delaware
No Drawing. Filed July 18, 1960, Ser. No. 43,328
4 Claims. (Cl. 260—293)

This invention relates to certain 4-substituted piperidinopropionitriles, and to processes for the manufacture thereof. More particularly, this invention relates to chemical compounds of the formula

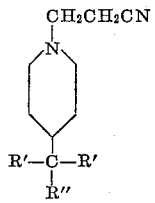

wherein R' and R" each and variously represent hydrogen, hydroxyl, or an alkyl or phenyl radical.

Among the alkyl radicals represented by R' and R", especially lower alkyl radicals are preferred, which is to say methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ radicals wherein $n$ is a positive integer amounting to less than 9.

Equivalent to the foregoing basic nitriles for purposes of this invention are corresponding acid addition salts, of the formula

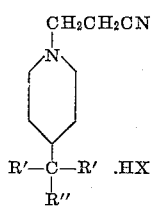

in which R' and R" have the same meanings assigned above and X represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage.

The compounds to which this invention relates are useful because of their valuable pharmacological properties. Thus, for example, they inhibit appetite, induce diuresis, and destroy fungi such as *Trichophyton mentagrophytes*. Moreover, the subject compounds—typically, 4-tert-butylpiperidinopropionitrile—exhibit a wholly unexpected capacity to counteract the heat, swelling, redness, and granuloma formation characteristic of the inflammatory response to tissue injury.

Manufacture of the compounds hereof proceeds by heating an appropriately 4-substituted piperidine

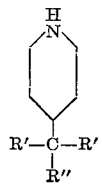

with acrylonitrile, R' and R" in the piperidine formula being defined as before. A basic catalyst such as trimethylbenzylammonium hydroxide can be employed if desired. Conversion of the resultant nitrile to an equivalent acid addition salt is accomplished by contacting it with an inorganic or strong organic acid, the anionic portion of which conforms to X as hereinabove set forth.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

*Example 1*

A. *4-tert-butylpiperidine.*—A solution of 125 parts of 4-tert-butylpyridine in 1000 parts of aqueous 75% acetic acid containing 12 parts of platinum oxide is subjected to vigorous agitation in contact with hydrogen at 500 pounds per square inch pressure for 13 hours. The resultant mixture is filtered, and the filtrate is stripped of solvent by vacuum distillation. The residue is thoroughly washed with 500 parts of aqueous 10% sodium hydroxide and thereupon distilled in vacuo. The colorless fraction boiling at 70–75° under 17 mm. pressure is the desired 4-tert-butylpiperidine. It is desirable to protect the product from carbon dioxide and moisture, in the presence of which 4-tert-butylpiperidine bicarbonate is formed therefrom. The bicarbonate melts at 97–100°.

B. *4-tert-butylpiperidinopropionitrile.*—A mixture of 14 parts of 4-tert-butylpiperidine and 50 parts of acrylonitrile is heated at the boiling point under reflux for ¾ hour. Excess acrylonitrile is removed by vacuum distillation, and the residual oil is extracted with 65 parts of ether. The ether extract is distilled in vacuo. The fraction boiling at 150–155° under 13 mm. pressure is the desired 4-tert-butylpiperidinopropionitrile. It has the formula

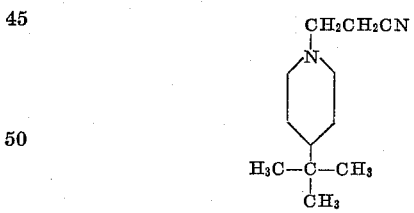

C. *4-tert-butylpiperidinopropionitrile hydrochloride.*—A solution of approximately 6 parts of 4-tert-butylpiperidinopropionitrile in 160 parts of anhydrous ether is made just acid with a solution of hydrogen chloride in 2-propanol. The small white flakes thrown down are 4-tert-butylpiperidinopropionitrile hydrochloride which, collected on a filter and dried in air, melts at approximately 254–255° (with decomposition).

*Example 2*

*4-(diphenylmethyl)piperidinopropionitrile.*—To a mixture of 25 parts of 4-(diphenylmethyl)piperidine and 48 parts of acrylonitrile is added 1 part of aqueous 40% trimethylbenzylammonium hydroxide ("Triton B"). After the heat effect thus induced subsides, the resultant mixture is heated at the boiling point under reflux for 1 hour. It is then cooled and diluted with an equal volume of ether. A precipitate forms, which is isolated by filtration and extracted with approximately 10 volumes of boiling ethanol. A small amount of material remains insoluble and is discarded. From the ethanol extract, on chilling, there precipitates white granular crystals of 4-diphenylmethyl)piperidinopropionitrile, melting at approximately 124–125°. The product has the formula

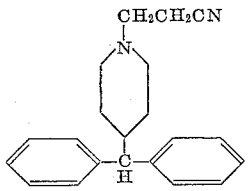

*Example 3*

*4 - (diphenylhydroxymethyl)piperidinopropionitrile.*—To a mixture of 27 parts of α,α-diphenyl-4-piperidine-methanol and 50 parts of acrylonitrile is added 1 part of aqueous 40% trimethylbenzylammonium hydroxide. When the mild exothermic reaction which results has subsided, the mixture is heated to the boiling point under reflux for 1⅔ hours. It is then cooled, precipitating a granular solid which is separated by filtration and washed with 25 parts of cold ethanol. This solid, pale yellow in color, is recrystallized from 240 parts of absolute ethanol to give dense sparkling colorless crystals melting at 160.5–162°. The material thus obtained is 4-(diphenylhydroxymethyl) piperidinopropionitrile, of the formula

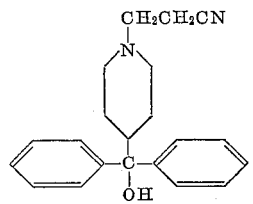

What is claimed is:
1. A compound of the formula

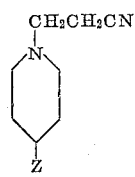

wherein Z represents a member of the group consisting of radicals of the formulas

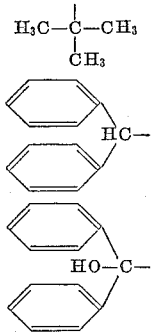

2. 4-tert-butylpiperidinopropionitrile.
3. 4-(diphenylmethyl)piperidinopropionitrile.
4. 4-(diphenylhydroxymethyl)piperidinopropionitrile.

References Cited in the file of this patent
UNITED STATES PATENTS
2,947,782   De Benneville et al. _____ Aug. 2, 1960

OTHER REFERENCES
Corse et al.: Journal of the American Chemical Society, volume 68, page 1912 (1946).